United States Patent
Irazabal

[11] Patent Number: 5,834,091
[45] Date of Patent: Nov. 10, 1998

[54] PROCESS AND MACHINE FOR THE FABRICATION OF DECORATED VULCANIZED AND POLYCHROME MATS, AND MATS THUS OBTAINED

[76] Inventor: Miguel Zubigaray Irazabal, P.I. Iciar, Parcela H 7, E-20829 Deba, Gipuzkoa, Spain

[21] Appl. No.: 737,123
[22] PCT Filed: Feb. 20, 1996
[86] PCT No.: PCT/ES96/00036
  § 371 Date: Oct. 15, 1996
  § 102(e) Date: Oct. 15, 1996
[87] PCT Pub. No.: WO96/26060
  PCT Pub. Date: Aug. 29, 1996

[30] Foreign Application Priority Data

Feb. 20, 1995 [ES] Spain .................................... 9500330
Feb. 14, 1996 [ES] Spain .................................... 9600347

[51] Int. Cl.[6] ........................................... B32B 7/00
[52] U.S. Cl. .......................... 428/119; 100/92; 100/214; 156/250; 156/258; 156/261; 156/275.5; 156/293; 156/298; 428/67; 428/78; 428/79; 428/80; 428/120; 428/159; 428/160; 428/167; 428/192
[58] Field of Search .................................... 428/119, 120, 428/67, 78, 79, 80, 192, 159, 160, 167; 100/92, 214; 156/250, 258, 261, 275.5, 293, 298

[56] References Cited

U.S. PATENT DOCUMENTS

| | | | |
|---|---|---|---|
| 2,340,392 | 2/1944 | Lefcourt | 156/220 |
| 4,435,451 | 3/1984 | Neubert | 428/15 |
| 5,234,738 | 8/1993 | Wolf | 428/119 |
| 5,618,607 | 4/1997 | Togawa | 428/119 |

FOREIGN PATENT DOCUMENTS

| | | |
|---|---|---|
| 0242315 | 10/1987 | European Pat. Off. . |
| 2647729 | 12/1990 | France . |
| 4134791 | 1/1993 | Germany . |
| 2008296 | 7/1989 | Spain . |
| 965957 | 8/1964 | United Kingdom . |
| 2233554 | 1/1991 | United Kingdom . |

*Primary Examiner*—Nasser Ahmad
*Attorney, Agent, or Firm*—Robert M. Schwartz, P.A.; Robert M. Schwartz; Loren D. Pearson

[57] ABSTRACT

This has a plurality of nubs which incorporate preset multicolored decorative designs in their bodies, created by a machine able to apply this manufacturing process, on a multilayered monobloc composed of a base, support and seating layer and another or other upper ones, some of which are on the same level and in which cavities are formed, giving rise to the nubs which define images that change according to their three dimensional structure and different locations, alignments and possible quincunx formation, as well as the different perspective of observers and the variations in the distance of the latter.

16 Claims, 5 Drawing Sheets

PROCESS AND MACHINE FOR THE FABRICATION OF DECORATED VULCANIZED AND POLYCHROME MATS, AND MATS THUS OBTAINED

FIELD OF THE INVENTION

The object of the present invention is a process and a machine for the manufacture of vulcanised decorated and multi-coloured mats and the mats thus obtained, which are of such a type that their active side is virtually defined by the points of a multitude of nubs which, in uniform distribution, emerge vertically from a mat body which fulfills the functions of a base resting upon the floor.

A first characteristic of this invention is a process aimed at incorporating in the vulcanised mat obtained multicoloured decorative designs which are imaginatively predetermined.

A second characteristic of the invention is the design of a machine capable of applying the above-mentioned manufacturing process.

A third characteristic is that the vulcanised mat is of a monobloc construction and is composed of different layers, consisting of a base layer, which supports another or other upper ones, in which cavities are arranged. From these emerge the uniformly distributed nubs, which are truncoconical with spherical tips and whose points define the discontinuous and soft surface upon which the user treads.

Some of the layers may be arranged on the same surface level and all of them incorporate determined colours in their mass in such a way that, due to the arrangement of the cavities, different colours emerge which, appropriately distributed in the layers, define various images.

By virtue of the three dimensional structure of the nubs and their different placing, aligned or in quincunxes, as well as the varying perspective of the observer and his distance from the nubs, these images are perceived as changing and of a holographically generated style, which stimulates the attention of users.

BACKGROUND OF THE STATE OF THE ART

Currently, the only process used to decorate nubbed mats is by painting the multicoloured design in question on the tips of the nubs.

This process is not very effective because with use the paint which was applied comes off and soon the most intensively used parts of the decorative design disappear, so that the decorative design becomes completely disfigured even though the mat is practically new.

On the other hand, nub mats manufactured by the traditional vulcanising press process are of the same colour throughout or, if more than one colour is featured, these are randomly distributed, because such traditional methods do not allow of an ordered distribution of different colours of rubber material in the vulcanising mould such that the mat obtained displays a predetermined colour pattern, at least when this is to be achieved by an industrial process rather than by craftsmanship.

EXPLANATION OF THE INVENTION AND ITS ADVANTAGES

In the face of this state of affairs, the new process propounded here will ensure that the multi-coloured decorative design is integrated in the very mass of the nubs; so that the design will endure in all its splendour even when the nubs begin to wear through use, since the new substratum which will be revealed has the same colour as the worn down surface and will retain it until the nubs are completely worn away, or what amounts to the same, until the end of the mat's useful life.

To this end, according to this new process, in a first operation, the cutout or cutouts with their respective outlines and colours corresponding to the different parts which make up the chosen decorative design are prepared in untreated rubber.

In a second operation, the untreated rubber base is made with a perimeter corresponding to the mat to be manufactured.

In a third operation, these decorative cutouts are put in their exact places upon the above-mentioned untreated mat-base.

In a fourth operation, the untreated ensemble obtained consisting of mat-base and decorative cutouts, is placed in a punch—press which is a kind of inverse action vulcanising press, in such a way that the untreated ensemble rests on the base provided by the lower housing of the punch—press which operates in relation to a corresponding upper punch—cover whose active side is formed by a multitude of cavities separated by sharp edges whose function it is to form the nubs of the mat to be made.

In a fifth operation, the punch—cover is closed over the housing—bedplate and stamps out with its edges, first, the decorative cutouts, where these exist, and then, the mat-base itself, preforming as it does so the base nubs, the decorative cutout nubs and, finally, the mixed nubs when these are contained within the outline of the decorative design or internal differentiated areas of the same.

In a sixth and last operation, the inverted vulcanising press is ensured by the operative movement of its mobile table, producing the press pressure and vulcanising effect which definitively and in a stable manner forms the nubs in relation to their corresponding cavities in the above-mentioned punch—cover.

Effectively, with this new process, the cavities in which the nubs included in the decorative design are to be vulcanised, are first filled with material of the colour which corresponds to this design, which will remain at the tip of the nub, and then be complemented by the base material of the mat, which will remain only at the base of the nub.

In those cavities which coincide with the delimiting outline of the decorative design or with differentiated areas of the design, this stratified filling will only be produced on the inside edge of this outline, while on the outer edge the cavities will be filled only with the base material from the mat or from the differentiated area next to the decorative design. Logically, in the cavities which lie outside the design or one of its differentiated areas, only base material from the mat or from the adjacent differentiated area will enter.

As a result of all this, the decorative design is integrated into the mat with a perfectly defined outline.

The great virtue of this new process is rooted in a philosophical conception involving the creation of a mould which is the inverse of the conventional method, and which together with the punching ensures the distribution of material in the cavities in accordance with the decorative design, and also keeps the material in the alveoli until vulcanisation is performed, which cannot be done using conventional moulding, which is based on the material flowing in until it fills a mould in which the features are situated in the mould's lower part (for example, vulcanised shoe soles).

Consequently, putting this process into practice industrially entails a machine of peculiar construction which, in accordance with the invention, consists of a kind of vulcanising press equipped with a punch—press composed of a lower housing—bedplate in which the untreated ensemble of mat-base and decorative cutouts is deposited, and an upper punch—housing into which a plurality of cavities are cut which define between them sharp-edged stampers and whose hollows correspond to the nubs to be formed.

The die-mould has means of lineal or angular closure which operate downwards in combination or not with the run of the press which finally traps the punch—press which has been closed between the heating table and corresponding counter—face.

Therefore, the characteristics of the proposed machine lie in the fact that the formative cutting surface of the mould is on the upper face and that this has cutting edges which stamp the untreated rubber when the mould closes.

There may be various means for ensuring closure of the mould, its placement to ensure the vulcanising pressing and the way in which the machine carries out the pressing, and the enclosed drawings indicate a preferential one of the possible embodiments.

The mat offers a very interesting optical effect in that, depending on the degree of proximity of the observer, and thus his angle of vision in relation to the mat, only the colour at the tip of some of the nubs will be visible and, upon approaching, the other colours underneath will also become visible. Figuratively, we give the name "emergence" to this process whereby new colours appear as the observer draws nearer to the mat.

This "emergence" effect affords great decorative and advertising possibilities, as it enables the formation of designs which change depending on whether the observer is approaching or moving away, or otherwise, messages which are formed or deformed with the aim of offering a source of information, courtesy, friendliness, humour, etc. The following may be mentioned as examples: a sunrise over a landscape; two or more positions corresponding to the movement of an object or figure; greetings and farewells depending on whether the subject is entering or leaving an establishment, etc.

If it is wished that a certain figure does not undergo chromatic variation on emerging, this may be achieved by using a darker tone for the ends of the nubs (in areas of greater dispersion) than that used for their sides (in which a higher concentration of colour is produced).

Obviously, there may be boundary nubs that show a single colour on one of their sides from the top to the bottom and bands of different colours on the rest; there may also be nubs with bands of different colours, although in different combinations of colours and widths on one side in comparison with another (in this respect it has to be taken into account that generically superimposed substrates do not have to coincide in their shapes).

Within the scope of the invention it is planned that the nubs are distributed in different ways depending on the preferential direction (oblique or frontal) of the observer with respect to the mat and the visual effect that is wished for. If a greater concentration of colour is wished for or if a certain design requires high definition, then a quincunx arrangement is advisable, in which between each pair of nubs in the same row the nub of an adjacent rear row is visible to a greater or lesser degree, and in addition to this, with the same space between nubs the surface concentration of nubs is greater.

The result of all the above is that the characteristic effect of emergence is heightened; when a lesser concentration is desired, arrangements of nubs in squares with a rows and b columns which, as well as this, depending on the direction of vision offers two different degrees of concentration.

If the line of sight is parallel to the rows or the columns, then we will have a lesser concentration, while if the line of sight is along the diagonals, then we will have a higher concentration, although still less than in the case of a quincunx formation as then between each two nubs of a diagonal row another nub of the adjacent rear row will be visible, although these two frontal nubs are wider apart than the quincunx, given that they occupy positions diagonally opposed in a simple square (four nubs) of the said square formation.

DESCRIPTION OF THE DRAWINGS AND REFERENCES

To gain a better understanding of the nature of this invention, the enclosed drawings show a preferential form of industrial embodiment, this being merely for the purposes of offering an illustrative example, and is not limiting.

In FIGS. 14 and 15 the nubs (19*c*) located behind those in the first lines and even though they have not been sectioned like these have been given uniformly sloping striping, although closer together, to indicate that they all show the same colouration; this is because, as the colour is included within the material itself, no difference in colour is appreciable due to whether or not the material is sectioned or not.

FIGS. 16 and 17 show an example of the application of the invention in diagrammatic form. FIG. 16 shows, from a more distant view, a mat (26) installed in an entry door (25).

The following references are shown in these figures:
1.—Untreated sheet—mat.
2.—Decorative shapes are cut in the untreated material.
3.—Punch—press.
4.—Casing—bedplate, lower, of the punch—press (3).
5.—Casing—punch, upper, of the punch—press (3).
6.—Cavities in the casing—punch (5).
6a.—Trunco-conical portion of cavities (6).
6b.—Spherical portion of cavities (6).
7.—Sharp edges, or rows, between adjacent cavities (6).
8.—Nubs resulting from the punch (1).
9.—Nubs resulting from cut shapes (2).
10.—Nubs resulting from mixed punching (1) and cutting (2).
11.—A vulcanised and decorated mat.
12.—Vulcanising machine or press.
13.—Lower heating face of the press (12).
13a.—Piston of the lower press face (13).
14.—Upper heating counterface of the press (12).
15.—Rails for the punch—press (3).
16.—Rod.
17.—Cut corner of a vulcanised mat.
18.—The bottom of this mat.
19.—Generic nubs of a mat (1).
19a.—Single colour nub.
19b.—Crosswise view of a multicoloured nub.
19c.—Lengthwise view of a multicoloured nub.
19d.—Mixed multicoloured nub.
20.—Untreated rubber sheet.
21.—Punched layer of the untreated mat (20).
21a.—Lower sub-layer.
21b.—Upper sub-layer.
22.—An unpunched layer of the sheet (20).
23.—From a more distant view.
23a.—Lines of sight from further away (23).
24.—Close-up viewpoint.
24a.—Lines of sight from closer (24).
25.—Entry door.
26.—Door mat (25) from a distance.
27.—Door mat (25) from closer.
28.—Showing cross-section.
29.—Showing cross-section.
30.—Showing cross-section.

PREFERENTIAL EMBODIMENT OF THE INVENTION

Figures 1, 2, 3, 3A, 4, 4A, 4B, 5:
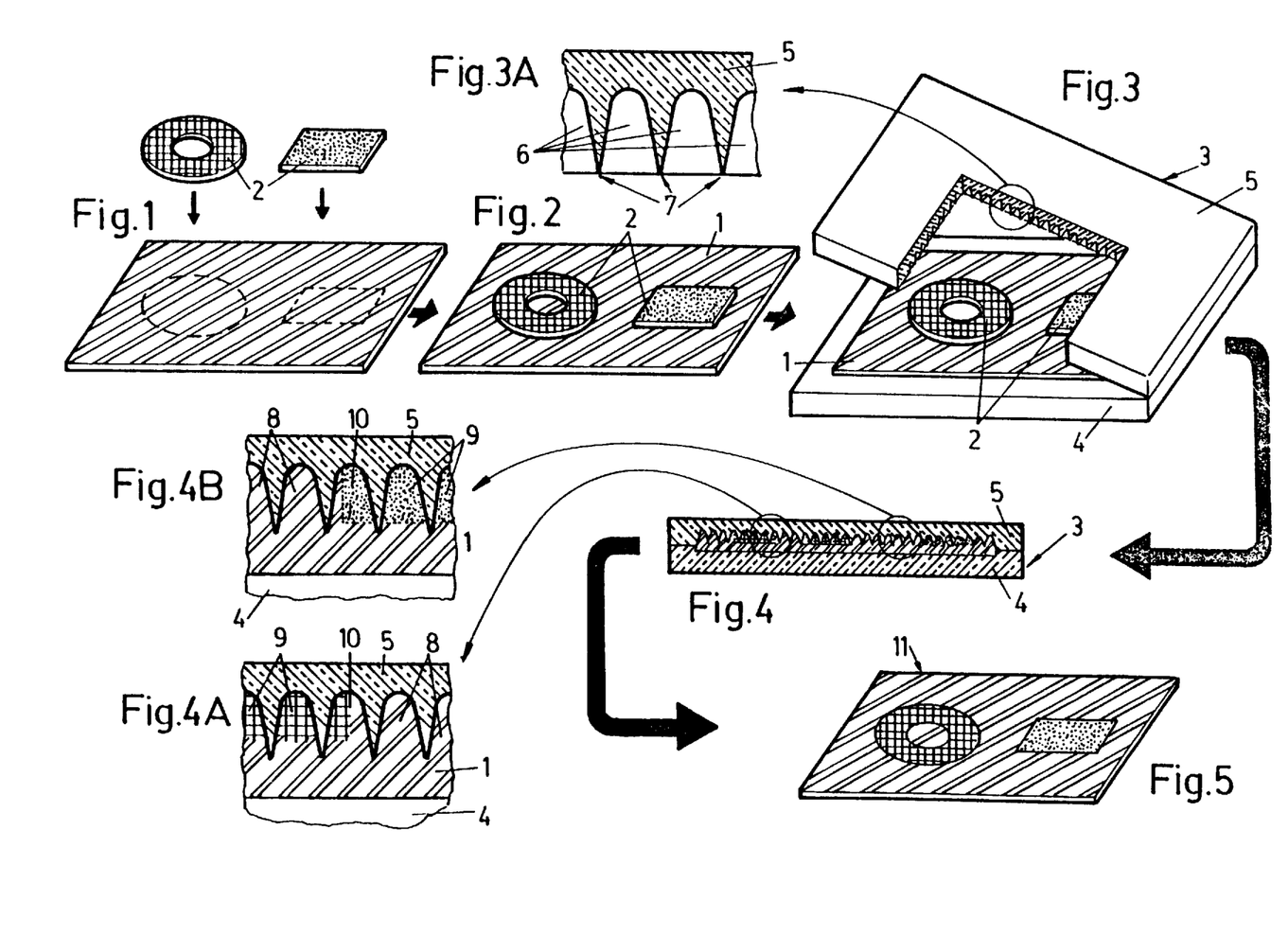
FIGS. 1 and 5 show in diagram form the operational sequence of the proposed process, from the moment at which the raw material of the sheet—mat is shaped (1), and the decorative shapes (2) are positioned, until the vulcanised mat (11) is obtained together with its multicoloured decoration.
FIGS. 3A, 4A and 4B are respective blown-up views corresponding to the ringed details shown in FIGS. 3 and 4.

In connection with the drawings and numbered references, the enclosed plans show the process and the preferential embodiment of the machine (12) for the manufacture of a vulcanised mat with nubs that incorporates any form of decorative design, in the way and as is designated with the numerical legend (11) in FIG. 5, and which shows two geometrical figures of different colours from each other and also respecting the general body of the same.

FIG. 1 shows the first and second operations of this process, which consist in setting the press face over the untreated rubber (1) and the decorative shapes (2) cut in untreated rubber of the desired colour for each usage.

In FIG. 2 the said cut shapes (2) have been positioned over corresponding places on the press (1) which have been marked out beforehand (see FIG. 1).

This untreated set, see FIG. 3, is deposited on the lower bedplate—housing (4) within the centre of the open punch—press (3) which, in its upper punch—housing (5) has empty cavities (6) such that between adjacent ones cutting edges are formed (7) being precisely designed to ensure the punching out of the plurality of the nubs on the mat (11).

These cavities (6) have a shape that is slightly trunco-conical (FIG. 3A) with a spherical bottom and form (FIGS. 4A and 4B) nubs (8) only of the material of the press (1), nubs (9) only of the material of the decorative cut shapes (2) or mixed nubs (10) of both materials or, even, of two or more different decorative cut shapes (2), depending on the place of the graphic design in which the cavity is to act (6).

The state of the punch—press (3) when closed, which brings about the vulcanisation phase, is shown in FIG. 4 in lengthwise cross-section.

FIG. 5 shows the mat once vulcanised (1) and with the decorative designs incorporated in its body.

Figure 6:
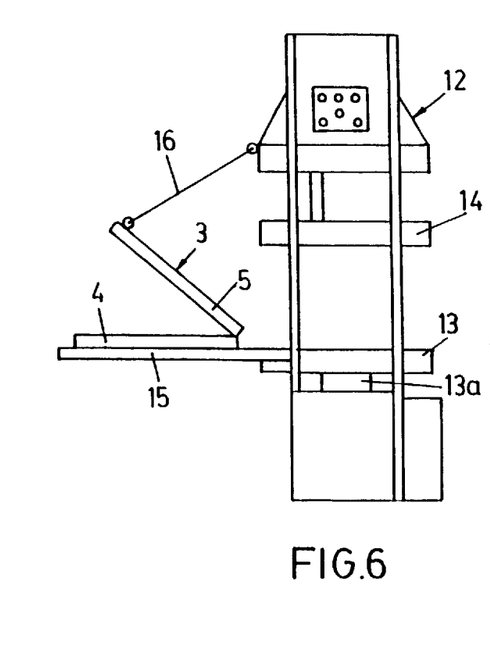
FIGS. 6 to 8 illustrate in diagrammatic form a preferential embodiment of the machine (12) as planned, in three different states of the process which correspond respectively to: punch—press (3) open; punch—press (3) closed and not pressed; and punch—press (3) closed and pressed.

A preferential embodiment of the machine (12) suitable for the application of this manufacturing process is that shown in diagrammatic form in FIG. 6 and which, basically, consists of a lower heating press (13) that is designed to hold the punch—press (3) and which, by means of its piston (13a), applies this to the upper heating counterpress face (14) which may, in turn, move against the casing of the machine (12).

Additionally, the lower press (13) is prolonged in the form of rails at the front (15) which facilitate the extraction (FIG. 6) of the punch—press (3) for the operations of placing the untreated material (1–2) inside and for taking out the vulcanised mat (11).

Figure 7:
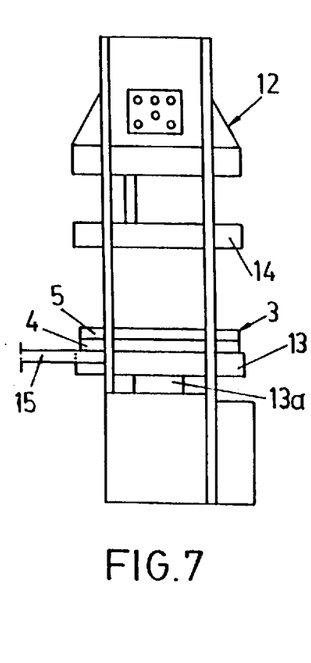
Figure 8:
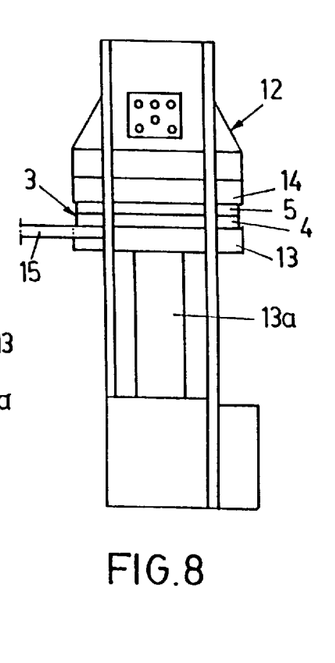

In combination with movement on the rails (15) it is planned that the punch—press (3) is to be hinged at the back and that at the front the end of the rod (16) is also to be articulated at its link to the casing of the machine (12) so that on removing the punch—press (3) this opens automatically and on placing it within the machine it closes (see FIG. 7) and is ready for being taken to the vulcanisation position that is shown in FIG. 8.

Obviously, the essence of the invention is not limited to this preferential embodiment, and it is possible that the punch—press (3) is not hinged, but rather that it has a linear closure; the rails (15) may not be incorporated, nor the rails (16); and the placing of the punch—press (3) in place during the vulcanisation phase may be ensured by another manner.

It is planned that the mat press (1) contain orifices that are emptied and punched out with the same configuration as the decorative cut shapes (2) that are to be used, such that the decorative cut shapes are inserted into the emptied—punched orifices.

The nubs (7, 8, 9) may take a geometrical form (conical, trunco-conical, cylindrical, prismatic, etc.) as desired, with the only limit being that set by the need to be able to remove them from the mould. The possibility of making decorated mats (11) without nubs has also been foreseen, i.e., smooth ones, supplying the decorative trim (2) pre-vulcanised and using an upper mould (5) that is free of cavities (6).

Figure 9:
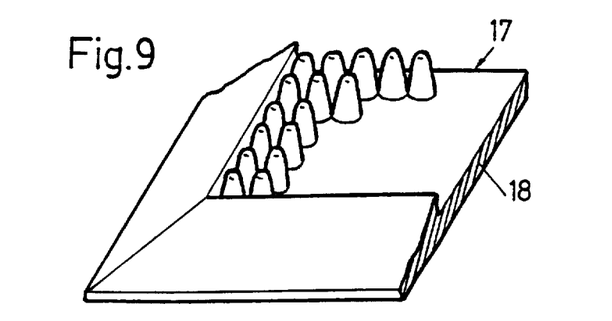
FIG. 9 shows a perspective view of a corner of a mat (17) of the type corresponding to the invention.
Figure 9A:
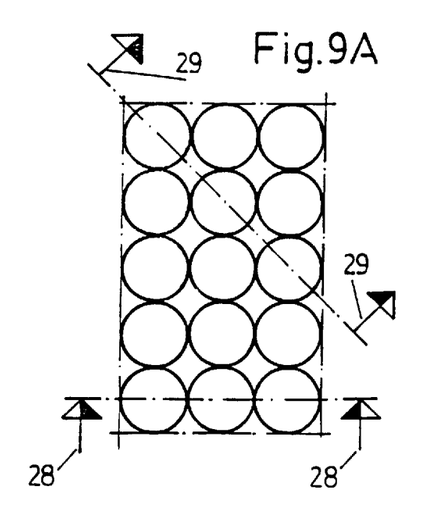
FIG. 9A shows in diagrammatic form a part of a mat (17) with nubs (19) in the form of a square in a rows and b columns.
Figure 9B:
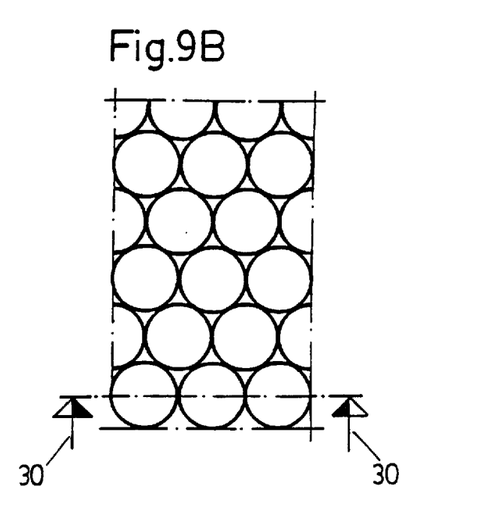
FIG. 9B is similar to 9A, although with the nubs (19) in the form of a quincunx.

In FIG. 9, we are shown a mat (17) in cross-section, with a base (18) on which there are a plurality of nubs (19); but having the particularity that the said mat (17) shows multicoloured designs or messages which are integrated within the vulcanised material itself and which, due to this, are not liable to unsticking with usage; on the contrary, they remain inalterable.

Figure 10:
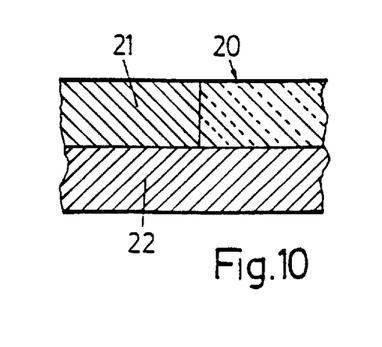
FIG. 10 is a cross—section of a part of the sheet of untreated rubber (20) with a punched layer (21) not subdivided.
Figure 11:
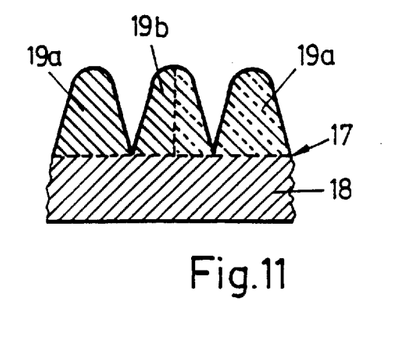
FIG. 11 is the part of the untreated sheet (20) of FIG. 10, once it has been vulcanised.

The mat obtained according to FIGS. 10 and 11, from a sheet of crude rubber (20) may be composed of double top layers (21) which is to be punched by the face with cavities of the punch—press (19) during the vulcanisation process; and a single lower layer (22) which is the origin of the base (18).

Particularly in this case, single coloured nubs (19*a*) have been created, each one of which is a different colour, and a two—coloured nub (19*b*) which forms the boundary and incorporates the said two different colours; this two coloured nub (19*b*) is generically designated a crosswise multicoloured nub, given that it may incorporate other different colours which appear as the nub is crossed from side to side, even though each of these is uniform from the top to the bottom.

Figures 12, 13:
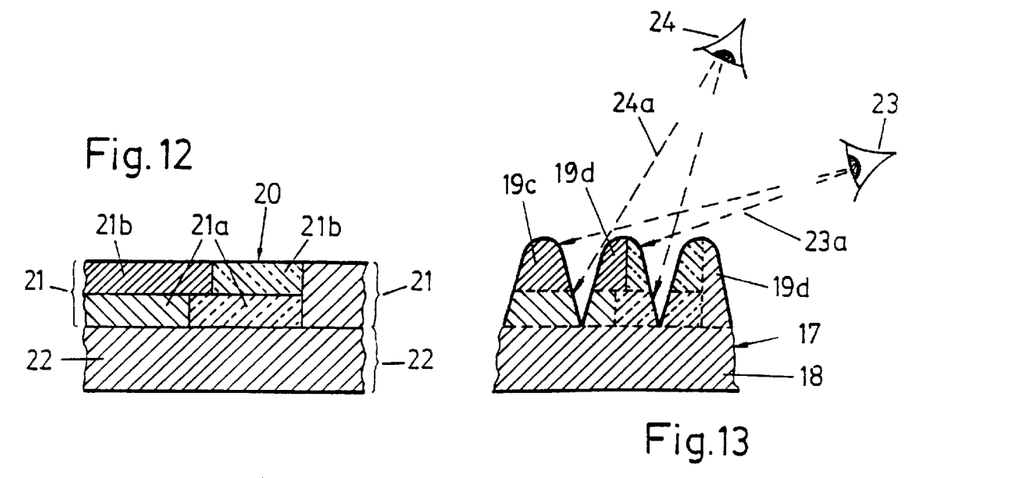
FIG. 12 is similar to FIG. 10, although here most of the punched layer (21) is divided into two sub-layers (21*a*, 21*b*) in two different ways.
FIG. 13 is the part of the untreated sheet (20) shown in FIG. 12, once it has been vulcanised, in cross-section as was the case for FIG. 9A under the legend (28—28) and which shows the phenomenon of emergence by means of a distant point of view (23) and a close one (24).

FIGS. 12 and 13 suppose the use of the same punch—press, although respecting a punched layer (21) that is composed of at least two sub-layers (21*a*, 21*b*) of different colours. As a result of this nubs that are multicoloured longitudinally will be produced (19*c*).

Logically there are boundary nubs which may contain a range of combinations: e.g., those of mixed multicoloured nubs (19*d*) (with changes of colour both lengthwise and crosswise) which delimit those areas in which there are sub-layers (21*a*, 21*b*) differing in colour from one side of the periphery of a single nub to the other, or where on one side the punched layer is subdivided and on the other it is not.

Figures 14, 15:
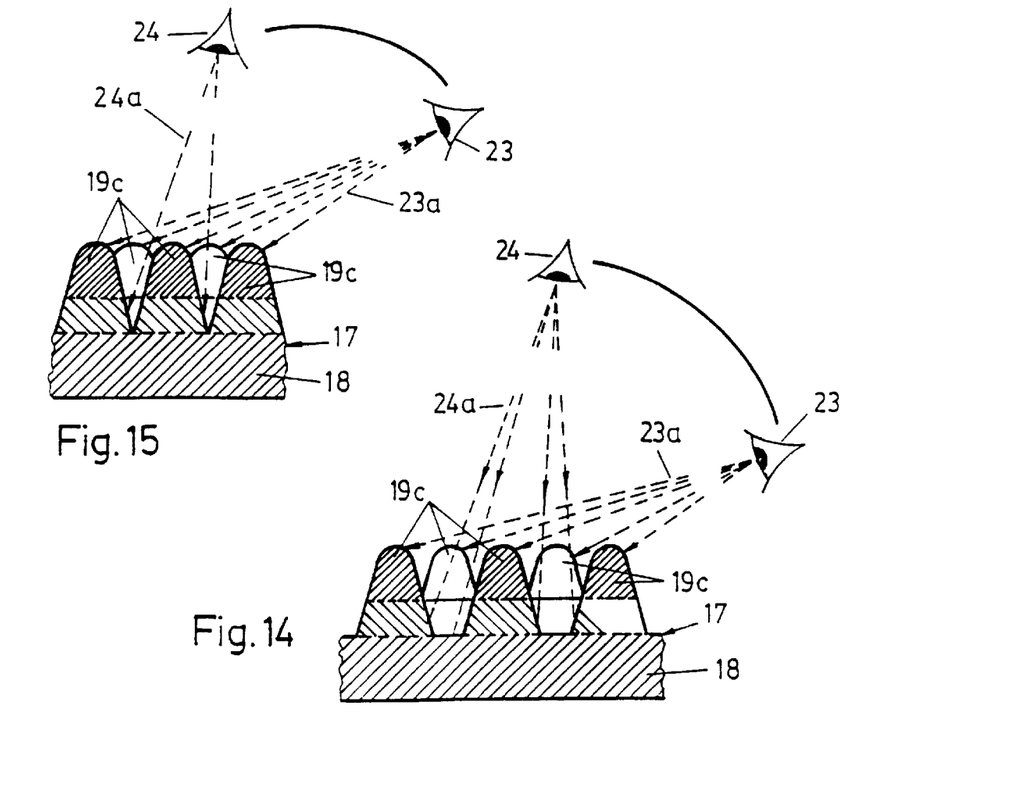
FIG. 14 is similar to FIG. 13, although with reference to the section marked in FIG. 9A with the legend (29—29), i.e., according to an oblique line of sight over the square formation shown in the said FIG. 9A. In this case all of the nubs have been shown as in (19C) of FIG. 13.
FIG. 15 is similar to FIG. 14, although with reference to a cross-section that is marked in FIG. 9B with the legend (30—30) this being indicative of any cross-section of any alignment of adjacent nubs in quincunx formation.

In FIG. 13 itself and in FIGS. 14 and 15 the way in which the characteristic effect of emergence is illustrated, due to which the coloured image on the mat varies according to the angle from which it is seen. When it is seen from afar (23) the line of sight (23*a*) only permits the tips of the nubs (19) to be seen; on the other hand, when seen from close-up (24) the lines of sight (24*a*) also permit the bases of the said nubs to be seen (19).

The simple visual contrast between these FIGS. 13, 14 and 15 illustrates the increasing degree of concentration of the nubs on the surface, this being directly related to the intensity of the effect of the emergence of images which characterises this invention.

Figure 16:
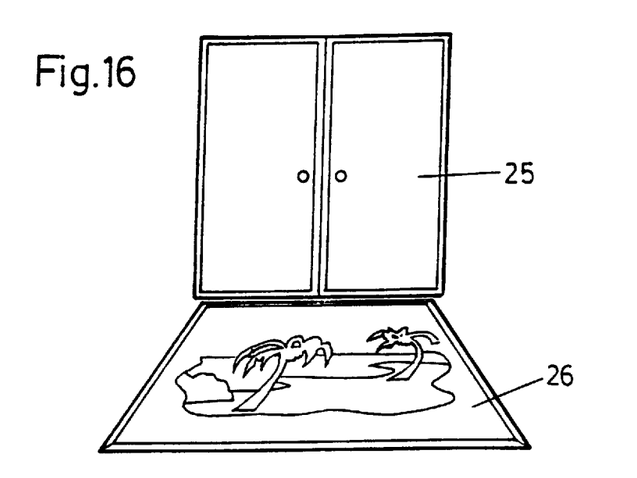
Figure 17:
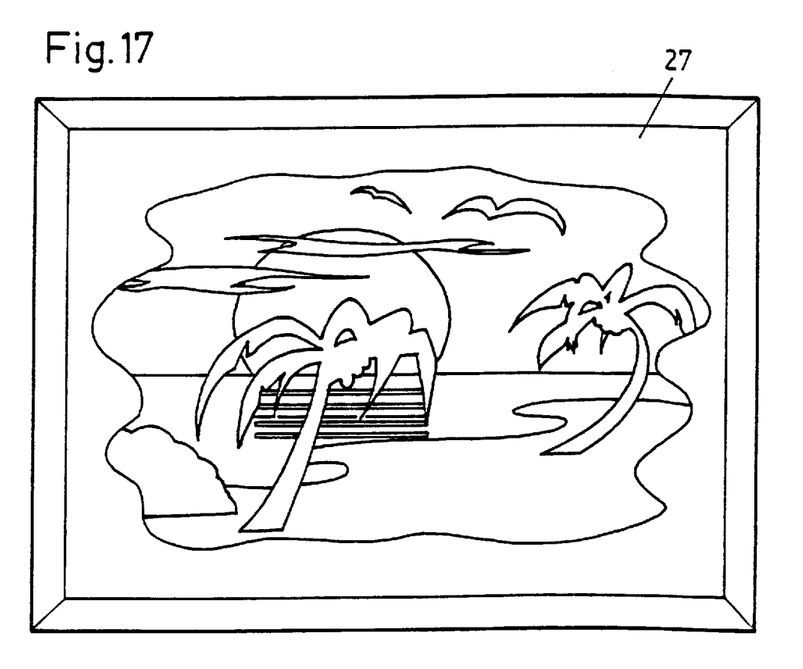
FIG. 17 shows the same mat (27) in a close-up view.

The above-mentioned enormous possibilities which, in the fields of design and advertising, arise from this quality of mats according to the invention, are expressively shown in FIGS. 16 and 17.

When we are distant from the entry door (25) the mat is seen (26) as shown in FIG. 16, with a night time landscape; while when we approach closely, the mat is seen (27) as it is shown in FIG. 17, where the said landscape is illuminated by the sunrise, with clouds in front of the sun and, above this, birds in flight.

The nature of this invention having been described sufficiently, together with its industrial realisation, it only has to be added that as a whole and in its constituent parts, it is possible to introduce changes in the form, material and arrangement within the contents of the invention, and that such alterations would not alter the validity of its basis.

I claim:

1. A process for the manufacture of vulcanised, decorated and multicoloured mats, of those mats whose active surface is virtually defined by the tips of a plurality of nubs which, uniformly distributed, emerge vertically from the body of the mat itself, this functioning as the bed on which this rests on the ground, comprising the next steps:

in a first operation this or the cut shapes are defined in untreated rubber, and is given the respective shapes and colours corresponding to the distinct and differentiated parts of which the decorative design chosen is composed;

in a second operation, the sheet of untreated rubber is defined with the perimeter of the mat to be fabricated;

in a third operation, the said decorative cut shapes are put into position in their precise places over the said untreated mat—sheet;

in a fourth operation, the untreated whole obtained from the mat—sheet and the decorative cut shapes is placed within a punch—press corresponding to a type of inverse action vulcanising press such that the said untreated whole rests upon the bedplate which is formed by the lower housing of the said punch—press, and which operates together with a corresponding upper punch—press the active face of which is composed of a plurality of cavities separated by sharp edges the purpose of which is to form the nubs of the mat to be manufactured;

in a fifth operation, the said punch—press is closed over the said housing—bedplate and with its edges firstly forms the decorative cut shapes, where they exist, and secondly, the mat—sheet itself, preforming in this process the nubs of the sheet, nubs corresponding to decorative shapes and, eventually, also mixed nubs when these are contained within the boundary lines of the decorative design or in internal areas differentiated from the same; and a sixth operation, in which vulcanising pressing is ensured by the operational movement of the mobile face of the said inverse vulcanisation press, giving rise to the pressure of pressing and the vulcanising effect which forms the said nubs definitively and noticeably, respecting their corresponding cavities of the said punch—press.

2. A process for the manufacture of decorated and multicoloured vulcanised mats, in accordance with the preceding claim, wherein in relation to the said third operation and for the correct positioning of the said decorative cut shapes, it is planned to previously mark out the on the said mat—sheet the outlines of the said decorative cut shapes.

3. A process for the manufacture of decorated and multicoloured vulcanised mats, in accordance with the claim 1, wherein the said mat—sheet contains orifices that are emptied and punched out in the same configuration as the decorative cut shapes to be used, such that the decorative cut shapes are inserted within the orifices that are emptied and punched out.

4. A machine for the manufacture of decorated and multicoloured vulcanised mats that is a form of vulcanising press which comprises:

a punch—press composed of a lower housing—bedplate in which the whole of the untreated mat—sheet is deposited together with the decorative cut shapes, an upper housing—punch which has a plurality of cavities formed within it and which define sharp punching lines between them and the cavities of which are reciprocal with the nubs to be shaped; and lineal or angular means of closure of the punch—mould which operates from above in a downwards direction in combination or not with the pressing run which ends by trapping the punch—press that is already closed between the corresponding lower and counterface heaters.

5. A machine for the manufacture of decorated and multicoloured mats, in accordance with the claim 4, wherein said punch—press has means of closure which act in an angular direction and which function in combination with the run of the press.

6. A machine for the manufacture of decorated and multicoloured vulcanised mats, in accordance with claim 5 wherein these means consisting in that, in relation with the front of the machine the punch housing is hinged at the back to the housing-bedplate, while the punch housing is linked at the front to the frontal part of the machine by a rod which is articulated at its ends, and that the housing-bedplate is able to slide along rails arranged as a frontal prolongation of the said lower heating table.

7. A machine for the manufacture of decorated and multicoloured vulcanised mats, in accordance with the claim 6, wherein the said lower heating table is installed above a piston the purpose of which is to ensure an operational pressing in an upward run that keeps the punch—press pressed against the said upper heating counterface, during the vulcanisation that will result in a corresponding decorated and multicoloured mat with the chosen design.

8. A process for the manufacture of decorated and multicoloured vulcanised mats and the mats thus obtained, in accordance with the first claim, wherein the cut shapes are replaced by a punched layer which in all or a part of its surface has a thickness which is subdivided into two or with more sub-layers of untreated rubber.

9. Decorated and multicoloured vulcanised mats, in accordance with the manufacture process of the claim 8, wherein said two (21a, 21b) or more sub-layers have their own and unique colours which are different from each other.

10. Decorated and multicoloured vulcanised mats, in accordance with claim 8, wherein said two (21a, 21b) or more sub-layers have different peripheral shapes.

11. Decorated and multicoloured vulcanised mats, in accordance with claim 1, wherein some or all of the said nubs are nubs in which there are lengthwise and crosswise sections which have different coloured material.

12. Decorated and multicoloured vulcanised mats, in accordance with claim 11 wherein some or all of the said nubs are nubs in which there are two successive crosswise sections presenting at least one area where a different coloured material is superimposed together with, at least, one superimposed area of the same coloured material.

13. Decorated and multicoloured vulcanised mats, in accordance with claim 11 wherein the different colours at different heights present some of the said multicoloured nubs lengthwise, and are in combination with the colours which at the same or different levels present others of the said nubs to form different multicoloured images that are visible alternatively depending on whether the angle of vision of the observer is greater or lesser as he moves respecting the mat.

14. Decorated and multicoloured vulcanised mats, in accordance with claim 11, wherein depending on a preferential direction of the foreseeable viewing approach of observers, the nubs are aligned according to a diagonal direction in a square formation formed of a rows and b columns.

15. Decorated and multicoloured vulcanised mats, in accordance with the claim 11 wherein depending on a preferential direction of the foreseeable viewing approach of observers, the nubs are arranged in a principal direction in a square formation formed of a rows and b columns.

16. Decorated and multicoloured vulcanised mats, in accordance with claim 11 wherein depending on a preferential direction of the foreseeable viewing approach of observers, the nubs (19) are arranged in a quincunx formation.

* * * * *